United States Patent [19]

Elgan

[11] Patent Number: 5,213,022
[45] Date of Patent: May 25, 1993

[54] MULTI-DIRECTIONAL PORTABLE BAND SAWMILL FOR LUMBER AND FIREWOOD

[76] Inventor: Douglas L. Elgan, P.O. Box 83, Gooding, Id. 83330

[21] Appl. No.: 907,166

[22] Filed: Jul. 1, 1992

[51] Int. Cl.$^5$ .............................................. B23D 55/08
[52] U.S. Cl. ..................................... 83/797; 83/801; 83/803; 83/813
[58] Field of Search ............... 83/794, 801, 803, 811, 83/792, 809, 810, 795, 798, 797, 796, 813, 816; 125/21

[56] References Cited

U.S. PATENT DOCUMENTS

| | | | |
|---|---|---|---|
| 1,238,463 | 8/1917 | Reece | 83/801 |
| 1,653,662 | 12/1927 | Ritchie | 83/794 X |
| 3,926,089 | 0/0000 | Crane . | |
| 4,111,085 | 9/1978 | Johnson | 83/801 X |
| 4,245,535 | 0/0000 | Lockwood et al. . | |
| 4,519,283 | 0/0000 | Sanborn . | |
| 4,559,858 | 0/0000 | Laskowski et al. . | |
| 4,660,454 | 4/1987 | Elsey | 83/797 |
| 4,854,208 | 8/1989 | Aoyagi | 83/801 X |

*Primary Examiner*—Douglas D. Watts
*Assistant Examiner*—Rinaldi Rada
*Attorney, Agent, or Firm*—Frank J. Dykas; Craig M. Korfanta; Ken J. Pedersen

[57] ABSTRACT

The invention is a portable band sawmill which is able to make bi-directional horizontal cuts, as well as vertical cuts. A special carriage with a U-shaped inner member pivotally connecting two band saw wheel support members makes this possible. The wheel support members of the saw blade carriage are pivotally connected at one end to traveler assemblies which are, in turn, movably connected to vertical members of a generally rectangular, vertical sub-frame. The sub-frame spans the width of, and is, in turn, movably connected at two or more points, at least one on each side, to a generally rectangular horizontal main-frame. The horizontal main-frame supports a log to be cut. The vertical sub-frame is moved back and forth on the main-frame to provide horizontal cuts. The saw blade carriage is moved up and down on the vertical sub-frame by the traveler assemblies to provide horizontal cuts at different heights, and/or vertical cuts. The saw blade carriage, which supports the band saw, can rotate 0°-180°, relative to the vertical sub-frame, to present the cutting edge of the band saw blade for bi-directional horizontal cuts and angled cuts, as well as vertical cuts.

7 Claims, 6 Drawing Sheets

MULTI-DIRECTIONAL PORTABLE BAND SAWMILL FOR LUMBER AND FIREWOOD

BACKGROUND OF THE INVENTION

1. Technical Field

This invention relates generally to sawmills, and more particularly to portable sawmills of the band saw type. I have invented a portable band saw-mill system which is able to make bi-directional horizontal cuts, as well as vertical cuts.

2. Background Art

U.S. Pat. No. 3,926,086 (Crane) discloses a portable sawmill for horizontal only cuts in a log with a chain saw.

U.S. Pat. No. 4,111,085 (Johnson) discloses a compound curvature cutting machine with a cutting element which may be adjusted in any one of five directions, relative to the machine bed. Once adjusted, the carriage with the cutting element may be moved in the horizontal or vertical directions.

U.S. Pat. No. 4,245,535 (Lockwood, et al.) discloses a portable sawmill with a saw blade at least twice as long as the log to be cut.

U.S. Pat. No. 4,519,283 (Sanborn) discloses an angled band sawmill for making horizontal only cuts on a log.

U.S. Pat. No. 4,559,858 (Laskowski, et al.) discloses a portable band sawmill with a cantilevered carriage for supporting the saw blade on one side of a frame. This saw makes horizontal cuts in only one direction, and does not make vertical cuts.

There is a need, then, in the portable sawmill industry for a saw which makes bi-directional horizontal cuts in two directions, as well as vertical cuts. Also, there is a need for a multi-directional saw which is movably supported on a carriage which is securely supported on two sides of a frame.

DISCLOSURE OF INVENTION

The invention is a portable sawmill of the band saw type which is able to make bi-directional horizontal cuts, as well as vertical cuts. The sawmill is able to accomplish these cuts by means of a special carriage for the saw band which can rotate 180° for horizontal cuts in both the back and forth directions, and which can rotate 90° for vertical cuts. In the vertical cut direction, the saw band can make single cuts to square the end of a board or log, and it can make two parallel cuts with each pass, providing a quick method for cutting long planks into short boards or logs into firewood, for example. Also, the carriage may rotate to any other angle between 0° and 180° to make angled cuts.

The special carriage is a substantially U-shaped inner member pivotally connected to two wheel support members at their inner ends, one on each end of the U-shaped inner member. The wheel support members are also pivotally connected at their outer ends to two traveler assemblies, one for each wheel support member. The traveler assemblies are movably connected to a vertical sub-frame assembly, and track along vertical members of the sub-frame to provide for vertical movement of the carriage. The vertical sub frame is movably connected on two sides of a horizontal main-frame assembly, and tracks along horizontal members of the main-frame to provide for horizontal movement of the carriage.

One of the wheel support members supports the drive wheel for the band saw blade, and the other wheel support member supports the idler wheel for the blade. The wheel support members are rotatable, relative to the vertical members of the sub-frame, to provide for horizontal cuts in two directions, angled cuts and vertical cuts. Angled cuts may be made by synchronous, relative movement of the vertical sub-frame horizontally, and the traveler assemblies and saw blade carriage vertically.

The U-shaped inner member is rotatable, relative to the wheel support members, to provide for clearance from the log during vertical and angled cuts while maintaining spacing and alignment between the two band wheels. The log being cut rests on the main-frame, or on a special log support rack fastened to the main frame.

BEST MODE FOR CARRYING OUT INVENTION

Referring to the Figures, there is depicted generally the portable sawmill at 10. The mill has a generally rectangular horizontal main-frame assembly 11 with two generally parallel side beams 12 connected and spaced apart by main-frame cross struts 13 to define central region 11'. Movably mounted on the flanges of side beams 12 are the bottom ends of two vertical members 14 of generally rectangular vertical subframe 15. In this depicted embodiment, vertical members 14 are mounted one on each side beam 12, they span the width of main-frame 11, and they are connected and spaced apart at their top ends by sub-frame cross strut 16. Preferably, vertical members 14 are pieces of high-quality, machined pipe. This way, they provide strong, straight and smooth supports for traveler assemblies 20. Two or more vertical members 14 may be provided. Three vertical members 14 may be provided, for example, two on one side beam 12 and one on the other side beam 12 to impart extra strength and rigidity to vertical sub-frame 15.

Mounted on sub-frame 15 is a sub-frame drive motor 17, preferably hydraulic, a sprocket 18 and chain 19, mounted on main-frame 11, for moving sub-frame 15 horizontally back and forth, relative to main frame 11. The motor 17 drives a sprocket 18 between two idler sprockets (not shown), so that the sprocket 18 "walks" the chain 19 and moves the sub-frame 15 horizontally along the main-frame 11. Chain 19 is fixably mounted to main-frame 11. The motor 17 is powered by a conventional auxiliary hydraulic pump, reservoir and pressure line assembly, not shown, which in turn is powered by a gasoline, diesel or electric motor, also not shown.

Two traveler assemblies 20 are movably mounted, one each on one of the sub-frame vertical members 14. The traveler assemblies 20 are preferably cylindrical collars with machined inner bushings cooperating with the machined outer surfaces of vertical members 14. Travelers 20 are connected to lift chains 21 which are moved by hydraulic lift cylinder 22 which is fixably attached to one of the vertical members 14 and connected to one of the lift chains by lift connector 23. Lift chains 21 pass over top sprockets 24 and bottom sprockets 25. Top sprockets 24 are connected by connecting rod 26 which ensures that both traveler assemblies 20 are raised and lowered by the same amount at the same time by hydraulic lift cylinder 22. Traveler assemblies 20, lift chains 21, hydraulic lift 22, lift connector 23, top sprockets 24, bottom sprockets 25 and connecting rod 26 act to adjust or move travelers 20 vertically, relative to sub-frame 15 and main-frame 11.

The special band saw blade carriage is pivotally connected on each end to the inside surface of travelers 20. The carriage has U-shaped inner member 27 pivotally interconnecting two wheel support members 28 and 29 at their inner surfaces. Wheel support member 28 supports the drive wheel 30 and wheel support member 29 supports the idler wheel 31 for band saw blade 32. Wheel support member 28 for drive wheel 30 has mounted on it saw blade motor 33 for turning the drive wheel 30. The other wheel support member 29 for idler wheel 31 has mounted on it saw blade tensioner 34 for adjusting the distance between the wheels in order to maintain proper tension in saw blade 32.

Preferably, saw blade motor 33 is a variable-speed hydraulic motor driven by a hydraulic pump which in turn is driven by an internal combustion engine or electric motor 33'. Preferably, the engine or motor, which may be of substantial horsepower, is fixably attached to the mainframe 11, and flexibly attached by hydraulic lines to the hydraulic motor which is on the carriage. This way, variable speed and torque may be applied to the drive wheel on the carriage without undue weight on or vibration of the carriage, while maintaining the carriage's ability to rotate 0°-180°.

At each location of relative pivotal motion on the saw blade carriage, means are provided for securing the relative positions of the U-shaped inner member 27, wheel support members 28 and 29 and traveler assemblies 20. This way, the carriage may be rotated into its respective relative position for the particular cut to be performed, and then securely locked in that position.

The sawmill may be made of ordinary materials for machine construction, preferably, for example, high-quality steel. I-beams are preferred for the main-frame side beams 12, box beams for the main-frame and sub-frame cross struts 13 and 16, respectively, and machined pipe for the sub-frame vertical members 14. All of these items may be reinforced, corrosion-proofed and/or painted as appropriate.

The mill's structural components may be fabricated by conventional techniques, like by welding, for example. The operational component parts, like the lift chains 21, hydraulic lift cylinder 22, top sprockets 24, bottom sprockets 25, rod 26, drive and idler wheels 30 and 31, respectively, saw blade 32 and saw blade motor 33 may be purchased off-the-shelf, and slightly modified, if necessary.

Traveler assemblies 20, U-shaped inner member 27 and wheel support members 28 and 29 must be specially manufactured. Travelers 20 are machined cylinders concentric with the outer cylindrical surfaces of sub-frame vertical members 14. Each traveler 20 is connected on its outer outside surface to a lift chain 21 which passes over top sprockets 24 at the top of vertical members 14, and over bottom sprockets 25 at the bottom of vertical members 14. Extension or retraction of the piston of hydraulic lift cylinder 22 moves lift connectors 23 and chains 21 which raises or lowers travelers 20.

Figure 2:
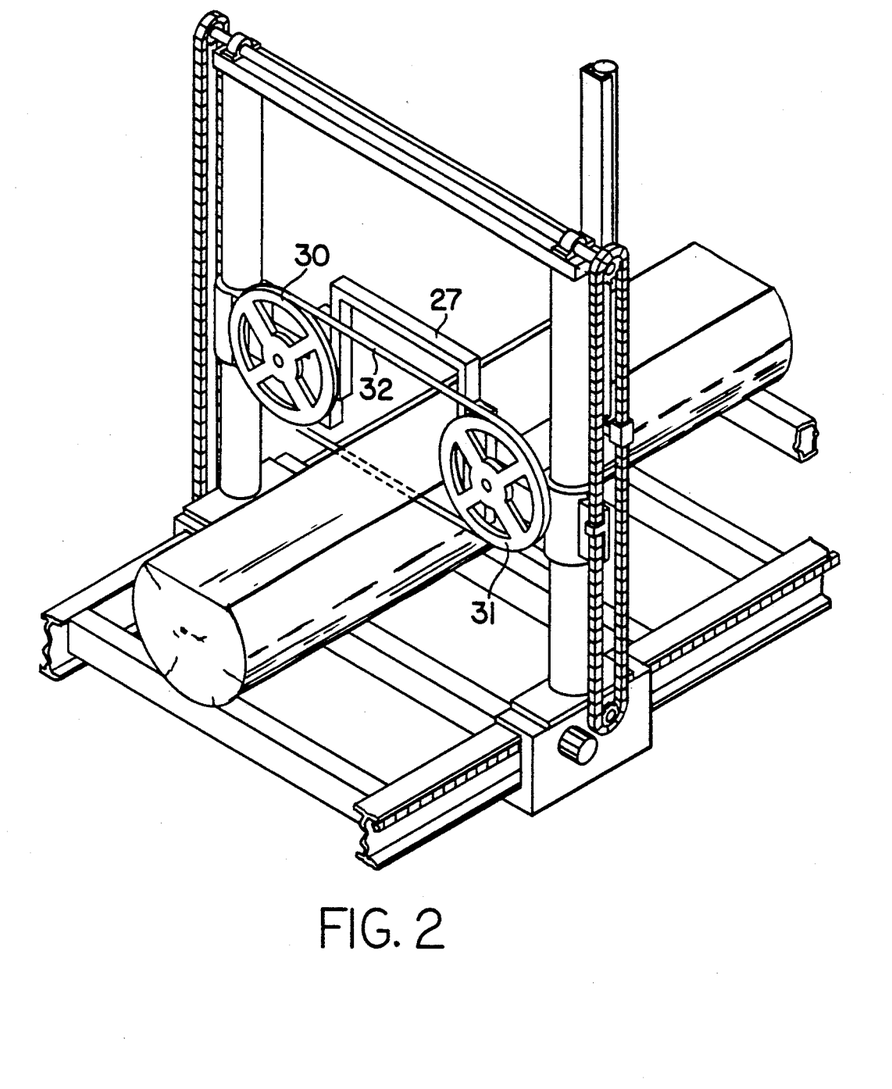
FIG. 2 is a partial, perspective view of the embodiment of FIG. 1, but with the saw blade carriage rotated 180° for a horizontal cut in the opposite direction.
Figure 3:
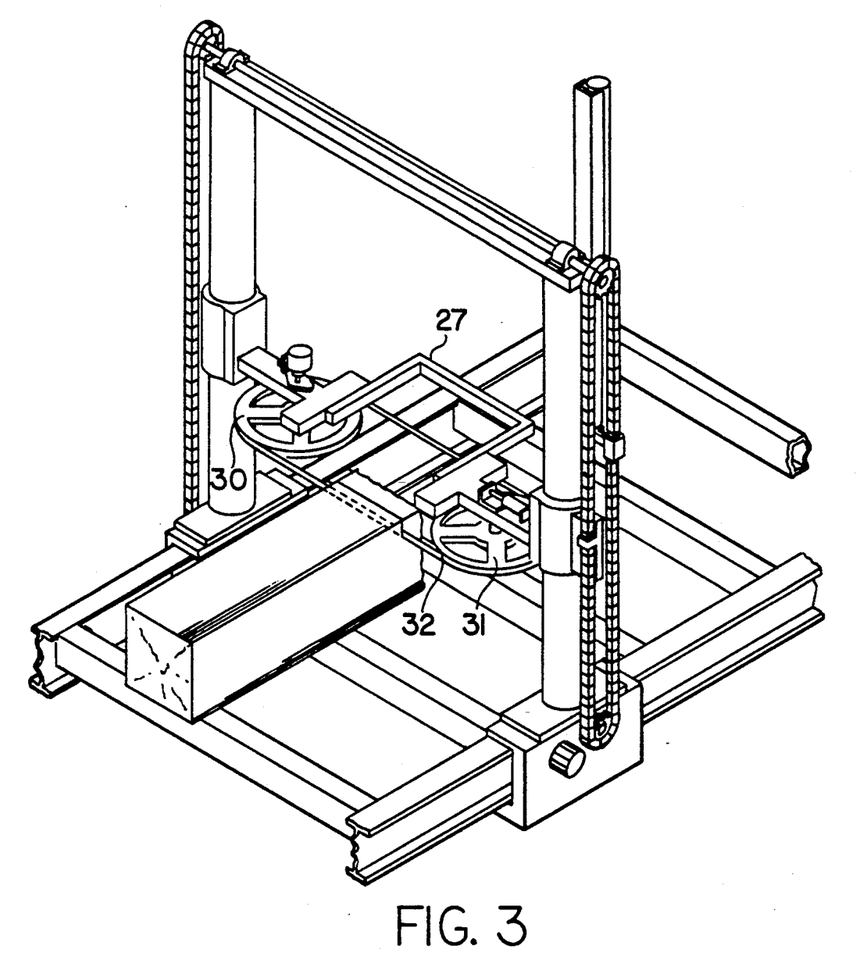
FIG. 3 is a partial, perspective view of the embodiment of FIG. 1, but with carriage rotated 90° for a vertical cut in a wood beam.

U-shaped inner member 27 is preferably made of square steel tubing. Inner member 27 is dimensioned so that it is slightly longer than the diameter of the largest log to be cut. Inner member 27 is pivotally connected at each of its outer surfaces to an inside surface of wheel support members 28 and 29 by inner pins 36. At least one side of inner member 27 has inner latch 37 to secure the inner member 27 to the wheel support member in at least two positions, either vertically with the bottom of the U-shaped inner member 27 up, as shown in FIGS. 1, 2, 4 and 5, or on its side horizontally, as shown in FIG. 3. Other latching positions or means may be provided for angled cuts.

Wheel support members 28 and 29 are preferably also made of steel box beams. Wheel support members 28 and 29 are dimensioned to fit closely between and pivotally interconnect U-shaped inner member 27 and travelers 20 by inner pins 36 on the inner surfaces and by outer pins 36' on the outer surfaces of the wheel support members.

Each pivot point is preferably made with pre-loaded Timken TM-type dual tapered roller bearings which allow side as well as end loading, and which allow the various members to rotate as a unit or independently.

Also, wheel support member 28 supports the drive wheel 30 with saw blade motor 33 for turning it, and wheel support member 29 supports the other idler wheel 31 for saw blade 32. The wheel support member 29 which supports idler wheel 31 has mounted on it saw blade tensioner 34, which is preferably a hydraulic cylinder which extends and recedes to slide the bracket holding the axle for idler wheel 31. This way, tensioner 34 adjusts the distance between the saw blade wheels in order to maintain proper tension in saw blade 32.

Auxiliary and optional systems may be provided to make this portable mill more convenient and efficient. For example, the power sources for the mill may be all electric. That is, electric motors may be provided to move the sub-frame 15, raise and lower the traveler assemblies 20, rotate the saw blade carriage, and rotate the drive wheel 30. Or, the power sources may be a combination of electric and hydraulic. That is, an electric motor may drive a hydraulic pump which drives hydraulic means for moving sub-frame 15, travel assemblies 20, the saw blade carriage and drive wheel 30. Or, the power source may be an internal combustion engine which drives a hydraulic pump, or any combination of these power supply means. Also, any control scheme, or combination of schemes, may be employed—electrical, hydraulic or pneumatic, or combination thereof.

Adjustable toe boards for leveling the log to be cut may be provided on the main-frame cross struts 13. A log turner which allows the operator to rotate a log on the main-frame, and a winch which allows the operator to load heavy logs onto the main-frame may also be provided. Hydraulic toe boards, log rotating arms and log clamps may also be provided to aid in the handling of heavier logs and boards. Also, a trailer assembly may be provided to make the sawmill system portable.

Figure 1:
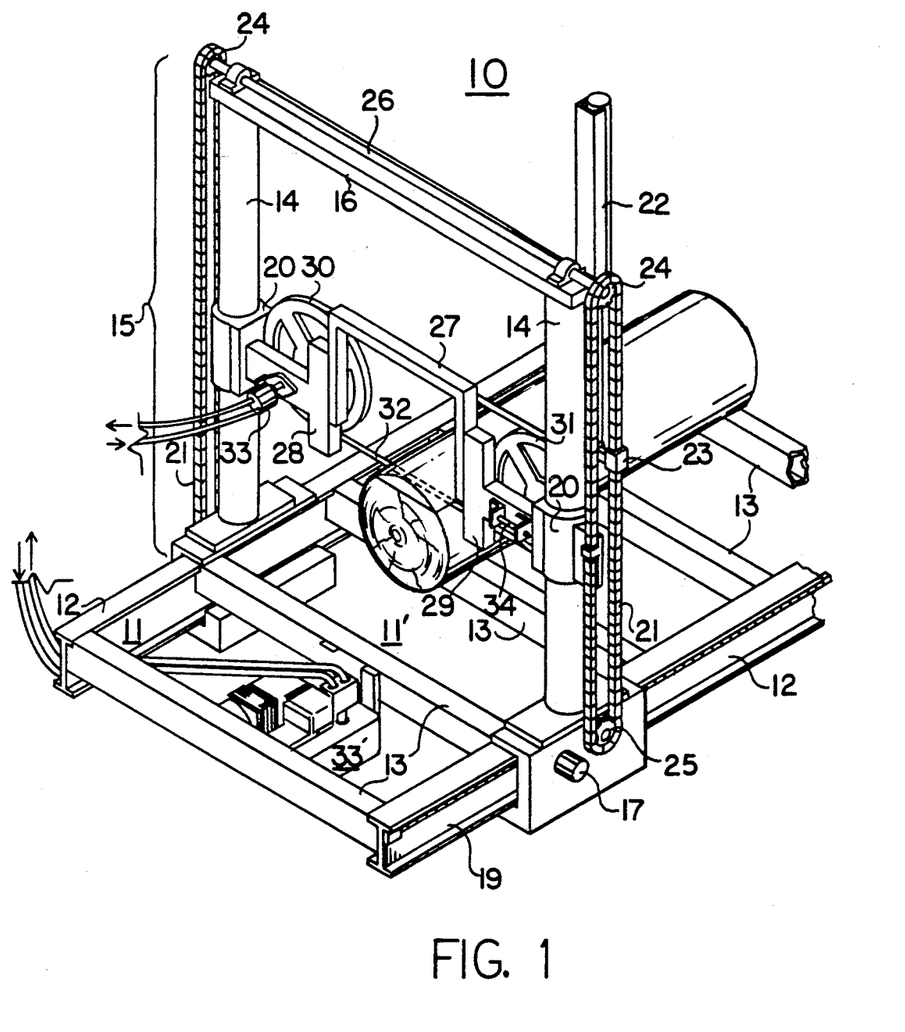
FIG. 1 is a partial, perspective view of one embodiment of my invention depicting a horizontal cut of a log in one direction.

During operation for cutting planks from a log, the band saw blade carriage is first in the vertical orientation depicted in FIG. 1. Saw blade motor 33 rotates drive wheel 30, which causes saw blade 32, which is frictionally gripped by the wheel, to move about the wheel, causing also idler wheel 31 to rotate. Typically, saw blade 32 has teeth only on its outside edge, the edge away from the wheel support members 28 and 29, so it can cut only in one direction. The hydraulic sub-frame motor 17 rotates, causing the sprocket 18 to move along chain 19 which pulls the vertical sub-frame 15 horizontally along the side beams 12. As vertical sub-frame moves horizontally, it moves the carriage over and saw blade 32 through the log to be cut.

At the end of the first pass, the wheel support members 28 and 29, and the U-shaped inner member 27 are rotated 180°, and the wheel support members locked into place. Then, U-shaped member 27 is rotated back 180° into the up position and locked into place. This way, the outside edge of saw blade 32 with teeth is presented again toward the log to be cut which is stationary on the mainframe. Then, hydraulic lift cylinder 22 is activated to lower traveler assemblies 20 the distance equal to the thickness of the next plank to be cut from the log. The hydraulic sub-frame motor 17 is next activated to rotate in the opposite direction, and vertical sub-frame 15 returns horizontally, moving the carriage and saw blade 32 back again through the log to be cut as depicted in FIG. 2. This way, successive bi-directional passes through the log with the saw blade produce flat planks of desired uniform thickness set by the vertical movement of the traveler assemblies.

Figure 4:
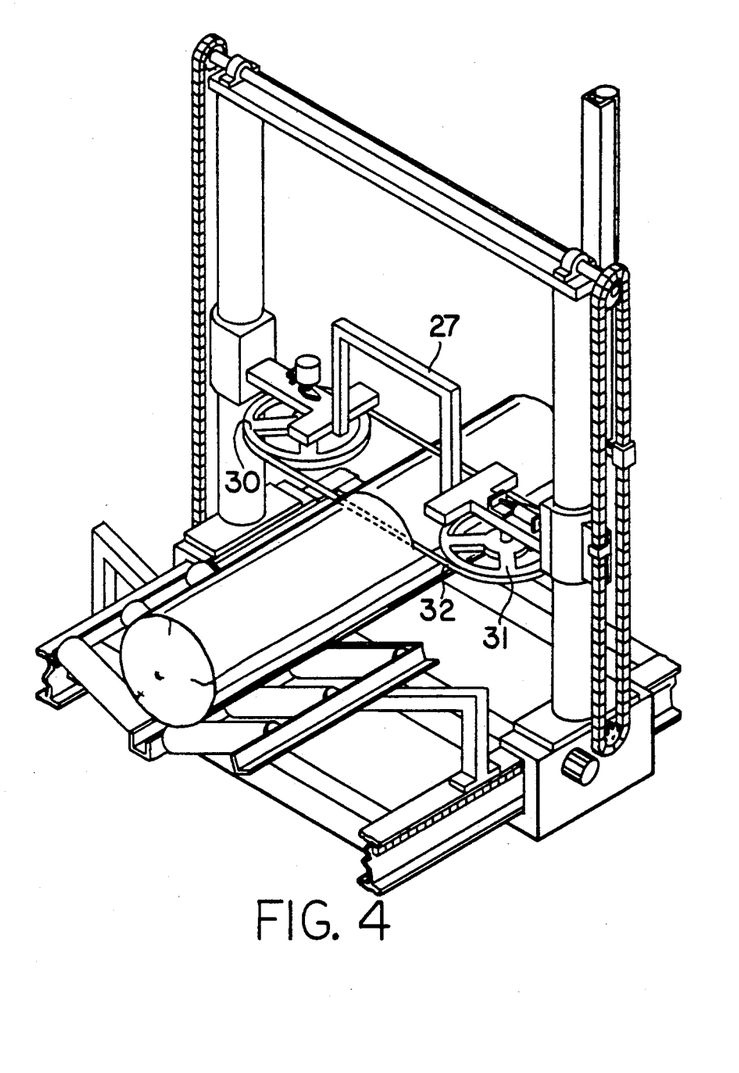
FIG. 4 is a partial, perspective view of the embodiment of FIG. 3, but with the U-shaped inner member rotated back 90° for two simultaneous vertical cuts in a log to be cut into short blocks supported on a rack on the main frame.
Figure 5:
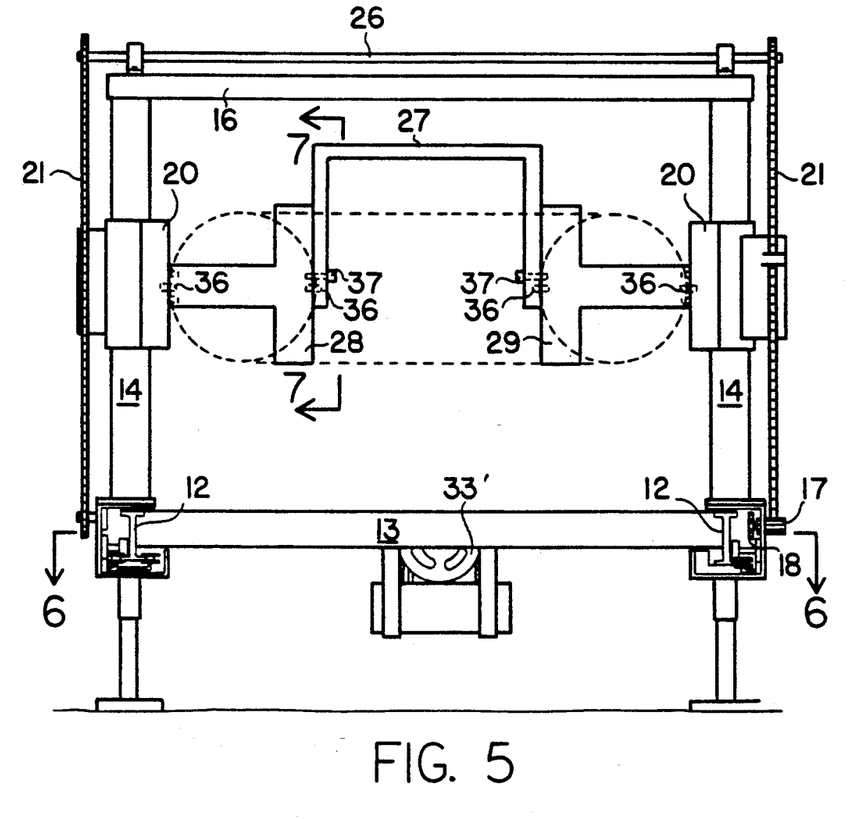
FIG. 5 is an end, elevational view of one embodiment of my invention, depicting the saw blade carriage in the same orientation as in FIG. 1.
Figure 6:
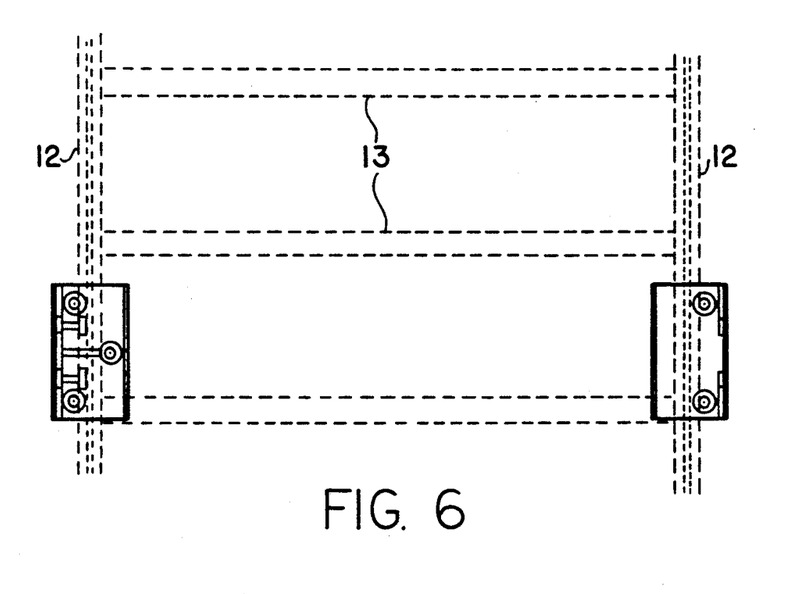
FIG. 6 is a top, partial cross-sectional view along the line 6—6 in FIG. 5.

During operation for vertical cuts, the band saw blade carriage is first rotated 90° from the position shown in FIG. 1 to the horizontal orientation depicted in FIG. 3, and locked while the U-shaped inner member is rotated back into the upright position shown in FIG. 4.

Figure 7:
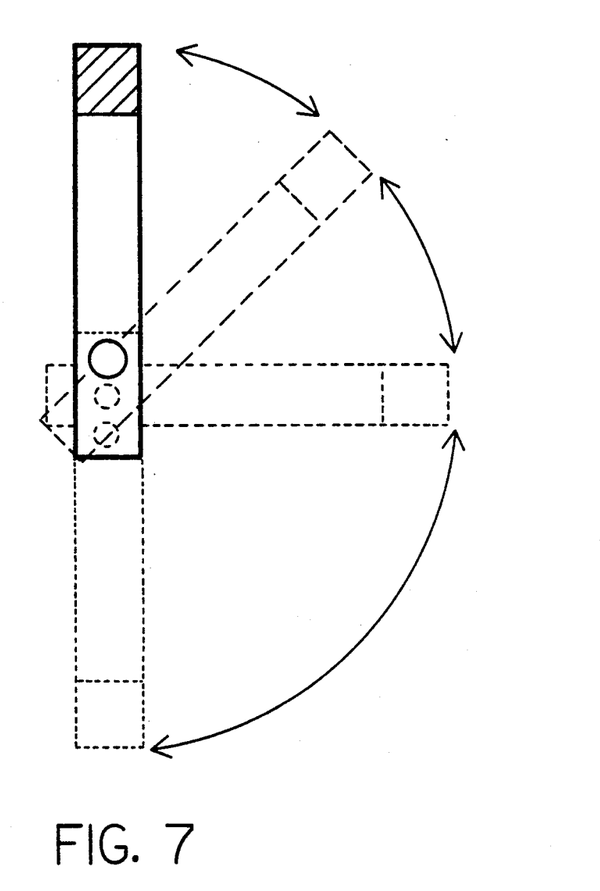
FIG. 7 is a side, partial cross-sectional view along the line 7—7 in FIG. 5.

In FIG. 7 there is depicted the rotational capabilities of the saw blade carriage. All locking or latching of members 27, 28 and 29 may be done manually or automatically with electric, hydraulic, or pneumatic control systems, or combinations thereof. Preferably, the latching mechanisms are tapered, locking pins.

While there is shown and described the present preferred embodiment of the invention, it is to be distinctly understood that this invention is not limited thereto but may be variously embodied to practice within the scope of the following claims.

I claim:
1. A portable band sawmill system comprising:
a generally rectangular horizontal mainframe assembly with two generally parallel sides and a center region;
a generally rectangular vertical sub-frame assembly with two vertical members, said sub-frame assembly spanning the width of said main frame assembly, and being movably connected to said main frame assembly at two locations, one of said two locations being on each of said two generally parallel sides of said main-frame assembly;
means for moving said sub-frame assembly horizontally, relative to said main-frame assembly;
two traveler assemblies, with inner surfaces oriented towards the said center region of said main frame assembly, one of said traveler assemblies being movably connected to each of two said vertical members of said sub-frame assembly;
means for moving said traveler assemblies vertically, relative to said vertical members of said sub-frame assembly; and
a band saw blade carriage comprising:
a drive wheel support member with inner and outer surfaces, said drive wheel support member being pivotally connected at its outer surface to one of said two traveler assemblies at the traveler assembly's inner surface;
a drive wheel supported by said drive wheel support member;
an idler wheel support member, also with inner and outer surfaces, said idler wheel support member being pivotally connected at its outer surface to the other one of said two traveler assemblies also at the traveler assembly's inner surface;
an idler wheel supported by said idler wheel support member;
a band saw blade supported by said drive wheel and said idler wheel;
a U-shaped inner member with two outer edges, said U-shaped inner member being pivotally connected at one of its outer edges to the inner surface of said drive wheel support member, and said U-shaped inner member being pivotally connected at the other one of its outer edges to the inner surface of said idler wheel support member;
means for driving said drive wheel;
means for pivotally connecting said drive wheel support member relative to said one of said two traveler assemblies;
means for pivotally connecting said idler wheel support member relative to said other one of said two traveler assemblies;
means for pivotally connecting said U-shaped inner member relative to said drive wheel support member and said idler wheel support member;
means for securing said drive wheel support member relative to said one of said two traveler assemblies;
means for securing said idler wheel support member relative to said other one of said two traveler assemblies; and
means for securing said U-shaped inner member relative to said drive wheel support member and said idler wheel support member;
so that the saw blade carriage may rotate 0°–180°, relative to said vertical sub frame assembly.

2. The sawmill system of claim 1 which also comprises means on said main-frame for supporting a log to be cut.

3. The sawmill system of claim 1 which also comprises means on one of said wheel support members for adjusting the distance between said band saw wheels.

4. The sawmill system of claim 1 wherein the means for driving the drive wheel is a hydraulic motor fixably attached to the carriage and flexibly connected to and remotely driven by an internal combustion engine attached to the main-frame, so that the hydraulic motor may be rotated with the carriage.

5. The sawmill system of claim 1 wherein the U-shaped inner member is pivotally connected to the wheel support members with dual tapered roller bearings.

6. The sawmill system of claim 1 wherein the wheel support members are pivotally connected to the traveler assemblies with dual tapered roller bearings.

7. The sawmill system of claim 1 wherein the means for driving the drive wheel is a hydraulic motor fixably attached to the carriage and flexibly attached to and remotely driven by an electric motor attached to the main-frame, so that the hydraulic motor may be rotated with the carriage.

* * * * *